(12) United States Patent
Melchior et al.

(10) Patent No.: US 6,293,709 B1
(45) Date of Patent: Sep. 25, 2001

(54) OPTICAL CONNECTOR

(75) Inventors: Lutz Melchior, Berlin; Reinhard Sander, Hassloch, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/201,730

(22) Filed: Nov. 30, 1998

(30) Foreign Application Priority Data

Nov. 28, 1997 (DE) .............................................. 197 54 772

(51) Int. Cl.$^7$ ...................................................... G02B 6/36
(52) U.S. Cl. ................................................................ 385/77
(58) Field of Search ................................ 385/76–81, 86, 385/87, 82–85

(56) References Cited

U.S. PATENT DOCUMENTS

| | | | | |
|---|---|---|---|---|
| 5,366,315 | * | 11/1994 | Hartley | 403/326 |
| 5,809,192 | * | 9/1998 | Manning et al. | 385/78 |
| 6,062,740 | * | 5/2000 | Ohtsuka et al. | 385/81 |

* cited by examiner

*Primary Examiner*—Frank G. Font
*Assistant Examiner*—Michael P. Mooney
(74) *Attorney, Agent, or Firm*—Herbert L. Lerner; Laurence A. Greenberg; Werner H. Stemer

(57) ABSTRACT

The optical connector has a basic body formed with a coupling end face at which optical fibers terminate. At least one separate aligning element and the basic body are provided with mutually cooperating form-locking elements such that the aligning element latches in the basic body.

6 Claims, 2 Drawing Sheets

OPTICAL CONNECTOR

BACKGROUND OF THE INVENTION

Field of the Invention

The invention lies in the field of single-channel or multi-channel optical connections. Use is made thereby of optical connectors—also designated ferrules or endpieces—for connecting one or more optical fibers for optical coupling. Within the scope of the present invention, an optical fiber is understood as a conductor capable of guiding and relaying an optical signal, such as optical fiber sets, optical fiber ribbons or optical conductors constructed on a substrate. The connector may be constructed as a plug-in connector, a socket-contact or mixed form, and can form a coupling-capable optical port of a circuit or printed circuit board, or a termination of an optical fiber cable.

The invention, particularly, pertains to a connector for the optical connection of one or more optical fibers. The connector has a basic body with a coupling end face, at which the optical fiber or fibers terminate. At least one separate aligning element is fastened on the basic body and extends beyond the coupling end face.

Such an optical connector has become known from U.S. Pat. No. 5,416,868 to Kakii et al. (European published patent application EP 0 642 043 A1). A basic body of that optical connector comprises two complementary shells and a plastic injection coating. The basic body has parallel V-grooves for holding individual optical fiber ends, which end with their coupling end faces on a common coupling end face of the basic body. Further V-grooves, which are situated opposite one another to form a receptacle for centering pins (aligning element), are worked into the two shells. The aligning elements are fixed in the V-grooves by casting or bonding and serve to align the optical connector accurately in position with reference to a corresponding coupling partner. In order to achieve a high coupling efficiency, the aim is thus to ensure that the optical fiber ends are aligned precisely with reference to optical elements (for example further optical fiber ends) of the coupling partner.

When assembling the prior art connector, it is necessary, at least during the application and the curing of the casting material, to have precise holding devices for positioning the aligning elements (centering pins) in order actually to retain the aligning elements in the desired position relative to the optical fiber ends. In terms of production engineering, the connector is complicated with regard to manipulation, metering and application of the casting medium for fixing the aligning elements. The overall effect of this is to increase the cycle times, the production period and thus the production costs.

SUMMARY OF THE INVENTION

It is accordingly an object of the invention to provide an optical connector, which overcomes the above-mentioned disadvantages of the heretofore-known devices and methods of this general type and in which the assembly and fastening of the aligning element on the basic body is substantially simplified.

With the foregoing and other objects in view there is provided, in accordance with the invention, an optical connector, comprising:

a basic body formed with a coupling end face at which one or more optical fibers terminate; and at least one aligning element fastened to the basic body and projecting beyond the coupling end face, the aligning element and the basic body being formed with mutually latching form-locking elements fastening the aligning element on the basic body.

In other words, the objects of the invention are satisfied in the context of the above-mentioned type of optical connector in that the aligning element(s) and the basic body are provided with cooperating form-locking elements that fasten the aligning element on the basic body by latching.

Within the scope of the present invention, the term "aligning element" is to be understood as all components which, in a way familiar to the person skilled in the art, lead to the aim of the mutual positioning with corresponding geometries of the coupling partner. Bodies with elongated geometries, for example cylindrical pins, pins or rods with a polygonal cross section or bolts prove, in particular, to be aligning elements suitable for this purpose.

Within the scope of the present invention, form-locking elements are to be understood as all geometries or configurations of a structural element which, in a way familiar to a person skilled in the art, accomplish the aim of positioning and fixing in a form-locking fashion in at least one degree of freedom. Cutouts, widened or thickened material parts, sawtooth configurations, slot/key combinations, pins with shoulders and corresponding bores, for example, prove to be particularly suitable for this purpose.

A substantial advantage of the connector according to the invention resides in the substantial simplification of the assembly and fixing of the aligning element. Further, the assembly can be quite accelerated with high reliability even by unpractised staff or in a completely automated fashion so the choice of suitable simple contours and geometries are accompanied by the principle (latching principle) which is simple in terms of production engineering. A particularly advantageous aspect is that the connector according to the invention merges completely without casting means or adhesives for fixing the aligning element, and is thus independent of curing processes. It is advantageously possible for the form-locking elements to be dimensioned in such a way that when specific tensile or compressive forces—which do not occur during normal connecting cycles—are exceeded, the aligning element can be separated from the basic body without being destroyed. If, however, fixing of the aligning element is ensured even in the case of very severe stresses, this can be safeguarded by additional connecting measures of a bonding type; in this case, as well, the additional measures can be undertaken in a secondary fashion and separately from fastening the aligning element.

In accordance with an added feature of the invention, the form-locking elements of the basic body are formed from a thermoplastic. This feature leads to particularly favorable properties with regard to the latching operation.

In accordance with another feature of the invention, the form-locking element of the basic body includes an elastically expandable opening and a holding opening aligned with the expandable opening for receiving the aligning element, and the aligning element is formed with a constriction latching in the expandable opening. This embodiment of the inventive connector is preferred in terms of production engineering. Here, the expandable opening is aligned with a holding opening of the basic body for the aligning element and a constriction of the aligning element latches in the expandable opening. Owing to the flush alignment of the expandable opening with the holding opening, when pushed into the holding opening the aligning element itself can ensure the expansion of the opening. As the insertion continues, the opening springs back over the restriction in the aligning element, and thus latches the aligning element on the basic body. In the final assembly, the aligning element is properly fastened and aligned both in the axial direction and the radial direction.

In accordance with a concomitant feature of the invention, the basic body is formed with an opening having a widened inner segment, and the aligning element is provided with a correspondingly thickened segment for latching in the widened inner segment of the opening. This is essentially an inverse configuration—that is to say thickening of a section of the aligning element and a corresponding holding ability of the basic body.

Other features which are considered as characteristic for the invention are set forth in the appended claims.

Although the invention is illustrated and described herein as embodied in a connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
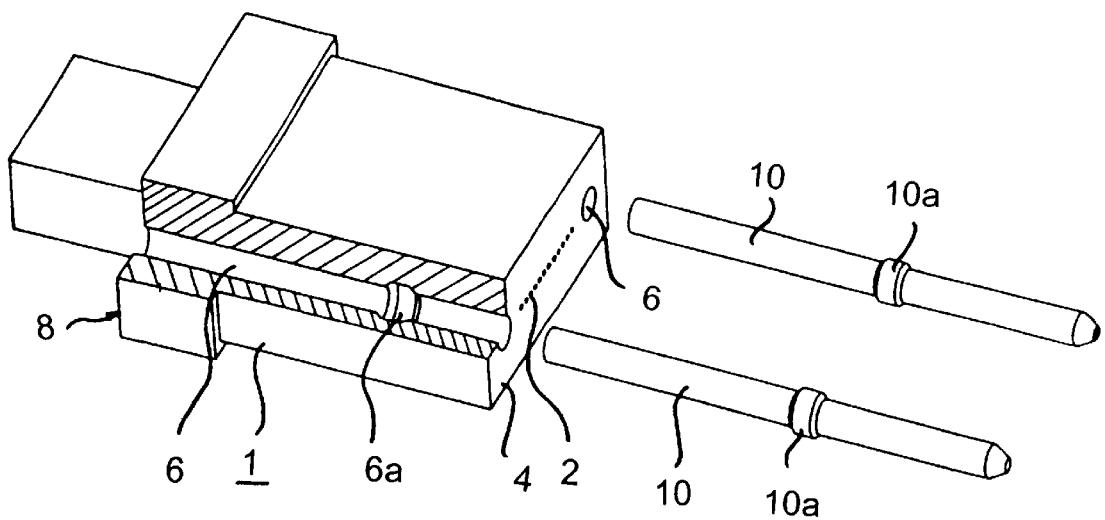
FIG. 1 is a partly broken away, perspective view of a first exemplary embodiment of a novel connector prior to the assembly of aligning elements.
Figure 2:
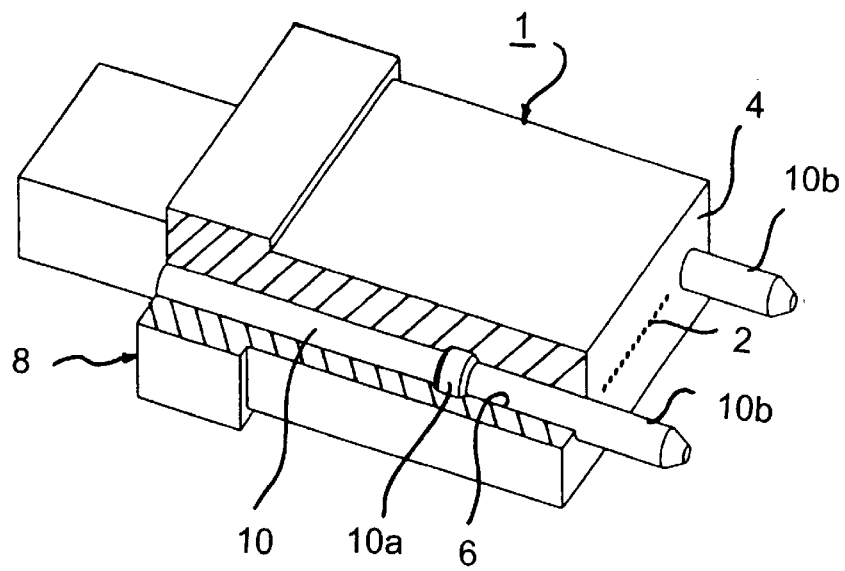
FIG. 2 is a similar view thereof, after the assembly of the aligning elements.

Referring now to the figures of the drawing in detail and first, particularly, to FIGS. 1 and 2 thereof, there is seen a connector with a basic body 1 that is preferably formed from a thermoplastic. The basic body 1 is formed with (diagrammatically illustrated) bores 2 for individually holding a plurality of optical fibers of a common optical fiber cable or optical fiber ribbon. The bores 2 and thus the optical fiber terminate at a coupling end face 4 of the basic body 1. The end face 4 can be finished, for example polished, in order to form coupling surfaces for the optical fibers which are of high optical quality. Furthermore, openings 6 in the form of through bores are introduced into the basic body, the through bores running on both sides of the optical fibers in a parallel fashion and with their longitudinal axes in the plane of the optical fibers from the coupling end face through to a back 8 of the basic body 1. The through bores 6 serve to hold one aligning element 10 each. The aligning elements are constructed, for example, as centering pins. The pins are formed in the middle region with a section 10*a* that is thickened in each case. The ends of the aligning elements can be provided in each case with a chamfer in order to facilitate the introduction of the aligning elements 10 both, during the assembly, into the through bores 6 and, in its final operation, into corresponding holding bores of a non-illustrated connecting partner. The latter are well known and are therefore not illustrated in detail.

Each bore 6 has a widened inner segment 6*a* in which, in the assembled state (FIG. 2), the thickened section 10*a* of the aligning element latches in a form-locking fashion. When the aligning element is introduced into the bore 6, the material of the basic body is therefore briefly expanded elastically to widen the bore by a measure which permits the thickened part 10*a* to pass. For this purpose, the material of the basic body can be suitably selected (for example as a thermoplastic), and/or the ability to expand can be ensured by shaping (for example single or multiple longitudinal slitting of the bore 6). In the latched-in state represented in FIG. 2, the thickened part 10*a* and the cutout or widened part 6*a* cooperate as form-locking elements in such a way that the aligning element 10 is fixed in a captive and reliable fashion and is held firmly in the basic body 1 even in the case of axial compressive forces or tensile forces. Section 10*b* of the connector projecting beyond the coupling end face cooperates in a way that is well known in the art (see, for example, U.S. Pat. Nos. 5,199,093 and 5,416,868) with cooperating aligning means (for example aligning bores) of a coupling partner for the purpose of mutual positioning and alignment.

Figure 3:
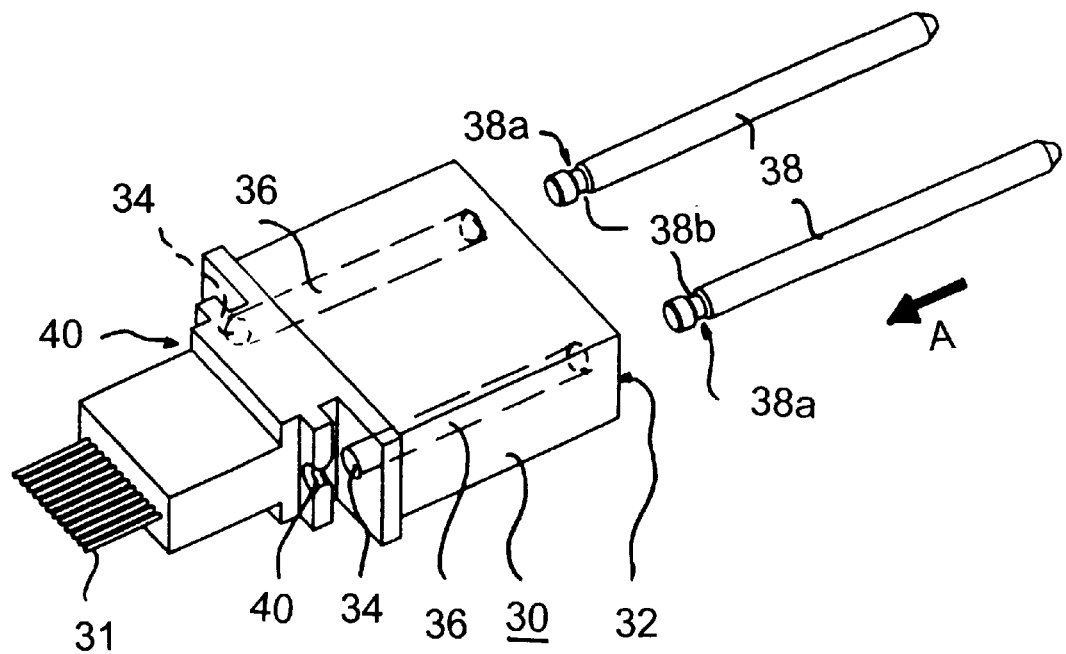
FIG. 3 is a perspective view of a second embodiment of the novel connector prior to the fastening of separate aligning elements on a basic body.
Figure 4:
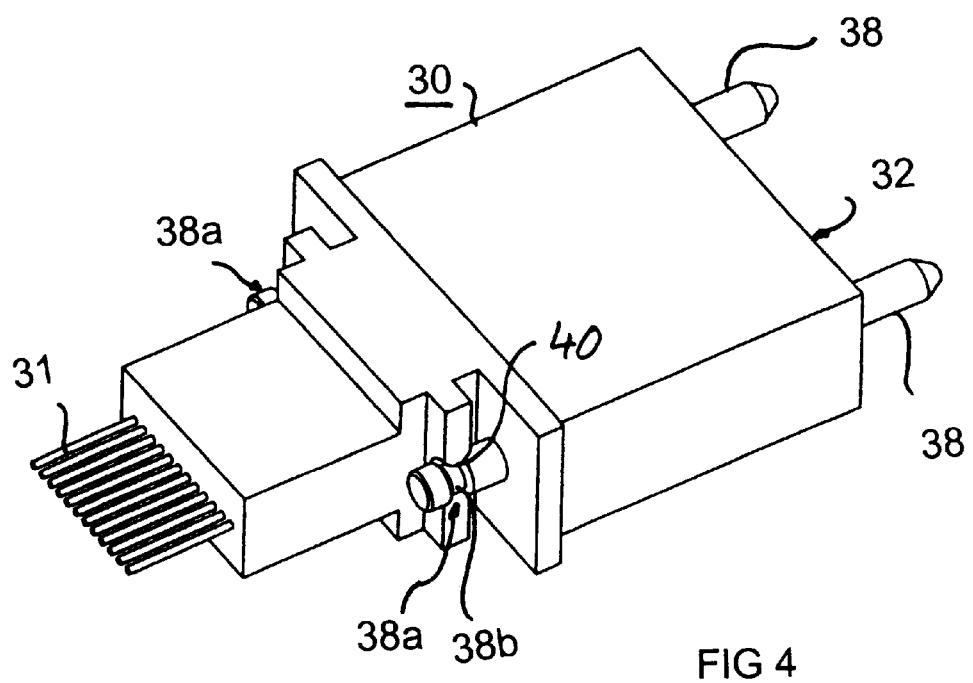
FIG. 4 is a similar view thereof, after the aligning elements have been fastened on the basic body.

FIGS. 3 and 4 show a variant of the connector in accordance with FIGS. 1 and 2, which is characterized, in particular, by rear form-locking elements arranged outside the interior of the basic body and serving to latch the aligning elements. In a way previously described, the basic body 30 has holding channels (not represented in detail) for individual optical fibers 31 of an optical fiber cable. The optical fibers end at the coupling end face 32 of the basic body 30. Visible in part only by indication in the rear region of the basic body 1 (FIG. 3) are the rear outlet openings 34 of two through bores 36 for holding two aligning elements 38 in the form of centering pins. The rear ends 38*a* of the centering pins 38 are provided in each case with a constriction 38*b*. An expandable opening 40 is constructed in each case downstream of the outlet opening 34 in the longitudinal direction and essentially comprises a slit bore which is provided at the insertion end with a chamfer and whose diameter is smaller than the diameter of the aligning elements outside the constriction 38*b*. At least the region of the expandable openings is advantageously formed from a thermoplastic. In the case of the embodiment according to FIGS. 3 and 4, it is therefore possible for the material to be selected in each case with regard to different optimization criteria for the front part, holding the optical fibers and the aligning elements, and the rear part in the region of the openings 40. For assembly purposes, the aligning elements 38 are inserted into the bores 36 in the direction of the arrow A, specifically until the rear ends 38*a* have penetrated the expandable opening 40. The upper expandable opening in FIG. 3 is covered by the basic body 1, and is therefore not visible. During the insertion operation of the aligning elements 38, the opening 40 is widened elastically, with the result that the rear end 38*a* passes through the opening; subsequently the opening 40 springs back to its original diameter, with the result that the restriction 38*b* is fixed in the opening 40 in a form-locking fashion.

We claim:

1. An optical connector, comprising:

a basic body formed with optical fiber bores each for holding a respective optical fiber and a coupling end face at which the optical fibers terminate; and at least one aligning element fastened to said basic body and projecting beyond said coupling end face, said aligning element and said basic body being formed with mutually latching form-locking elements fastening said aligning element on said basic body.

2. The connector according to claim 1, wherein said form-locking elements of said basic body are formed from a thermoplastic.

3. An optical connector, comprising:

a basic body formed with a coupling end face at which one or more optical fibers terminate;

at least one aligning element fastened to said basic body and projecting beyond said coupling end face, said aligning element and said basic body being formed with mutually latching form-locking elements fastening said aligning element on said basic body;

said form-locking elements of said basic body including an elastically expandable opening and a holding opening aligned with said expandable opening for receiving said aligning element, and said aligning element being formed with a constriction latching in said expandable opening.

4. The connector according to claim 1, wherein said basic body is formed with an opening having a widened inner segment, and said aligning element is provided with a correspondingly thickened segment for latching in said widened inner segment of said opening.

5. The connector according to claim 1, wherein said optical fiber bores are separate from said form-locking elements.

6. The connector according to claim 1, wherein said alignment element does not hold any optical fibers.

* * * * *